(12) United States Patent
Kobayashi

(10) Patent No.: US 10,474,516 B2
(45) Date of Patent: Nov. 12, 2019

(54) ENCODER

(71) Applicant: Mitutoyo Corporation, Kawasaki, Kanagawa (JP)

(72) Inventor: Naoki Kobayashi, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 135 days.

(21) Appl. No.: 15/598,929

(22) Filed: May 18, 2017

(65) Prior Publication Data

US 2017/0344417 A1    Nov. 30, 2017

(30) Foreign Application Priority Data

May 24, 2016    (JP) ................... 2016-103428

(51) Int. Cl.
*G06F 11/07* (2006.01)
*G01D 5/245* (2006.01)
*G01D 5/244* (2006.01)

(52) U.S. Cl.
CPC ....... *G06F 11/0715* (2013.01); *G01D 5/2458* (2013.01); *G01D 5/24495* (2013.01); *G06F 11/0751* (2013.01); *G06F 11/0772* (2013.01); *G05B 2219/37136* (2013.01)

(58) Field of Classification Search
CPC ............. G06F 11/0715; G06F 11/0772; G01D 5/2458; G01D 5/2454–2455; G01D 5/2451; G05B 23/00
See application file for complete search history.

(56) References Cited

U.S. PATENT DOCUMENTS

2009/0256065 A1*    10/2009    Kusano ............. G01D 5/34746
250/231.1

FOREIGN PATENT DOCUMENTS

JP    2005-345375    12/2005

* cited by examiner

*Primary Examiner* — Toan M Le
(74) *Attorney, Agent, or Firm* — Rankin, Hill & Clark LLP

(57) ABSTRACT

An encoder includes: a reading device that reads respective electric signals from two incremental patterns respectively having graduation array pitches different from each other; a control device that calculates a measurement value, based on the electric signals; and an output device that outputs the measurement value. The control device includes: an absolute position synthesis unit that synthesizes two electric signals to generate a synthesized absolute position; a detection unit that detects two relative positions from the two electric signals; a position calculation unit that performs an arithmetic operation between the relative positions and the synthesized absolute position to calculate a calculated absolute position; an absolute position comparison unit that compares the calculated absolute position with the synthesized absolute position; and a relative position comparison unit that compares the two relative positions with each other. The output device outputs error information, based on a comparison result output from the control device.

4 Claims, 6 Drawing Sheets

ENCODER

CROSS-REFERENCE TO RELATED APPLICATION

This non-provisional application claims priority under 35 U.S.C. § 119(a) from Japanese Patent Application No. 2016-103428, filed on May 24, 2016, the entire contents of which are incorporated herein by reference.

BACKGROUND

Technical Field

The present invention relates to an absolute encoder including a reading device that reads a plurality of relative movement amounts from a plurality of respective incremental patterns provided on a scale, the absolute encoder synthesizing the plurality of relative movement amounts to acquire absolute position information.

Background Art

Conventionally, an encoder has been known that includes a scale having an incremental pattern (INC pattern) consisting of graduations arranged in parallel along a measurement direction, and a head having a reading device that moves along the scale and detects a relative movement amount from the INC pattern. Examples of encoder types include an electromagnetic induction type, a capacitance type, and a photoelectric type.

Explaining the electromagnetic induction type as an example, an electromagnetic induction type encoder includes a scale having scale coils (graduations) arranged in parallel along a measurement direction, and an index scale (head) relatively movable along the scale. The head has a transmitting coil facing the INC pattern of the scale, and a receiving coil (reading device).

The electromagnetic induction type encoder detects a relative movement amount of the head to the INC pattern from change in magnetic flux detected by the receiving coil via the scale coil when the transmitting coil is excited.

In such an electromagnetic induction type encoder, for example, an electromagnetic induction type ABS encoder described in JP 2005-345375 A has three types of INC patterns respectively having graduation array pitches different from each other.

Wavelengths detected from the respective INC patterns are different from each other, and a fine pattern from which the shortest wavelength is detected, a coarse pattern from which the longest wavelength is detected, and an intermediate pattern from which an intermediate wavelength between the fine pattern and the coarse pattern is detected are arranged in parallel.

The electromagnetic induction type ABS encoder, first, synthesizes an absolute position (a synthesized absolute position), based on an electric signal read by the reading device from the INC patterns at the time of turning on a power supply, and initially sets the synthesized absolute position as a preset value. Next, during measurement, the electromagnetic induction type ABS encoder performs an arithmetic operation between the preset value and a relative movement amount (relative position) based on the electric signal read by the reading device from the fine pattern to calculate an incremental count (a calculated absolute position), and outputs the calculated absolute position as a measurement value. In addition, the electromagnetic induction type ABS encoder synthesizes relative positions respectively based on the intermediate pattern and the coarse pattern to generate the synthesized absolute position. Then, the electromagnetic induction type ABS encoder compares the calculated absolute position based on the fine pattern with the synthesized absolute position based on the intermediate pattern and coarse pattern, to perform the comparison operation for determining whether or not there is an error between the calculated absolute position and the synthesized absolute position.

In this way, the electromagnetic induction type ABS encoder performs the comparison operation between the calculated absolute position and the synthesized absolute position, thereby improving reliability of the measurement value.

SUMMARY OF THE INVENTION

Problems to be Solved by the Invention

However, a predetermined time is required to calculate the synthesized absolute position in such an encoder, and when a moving speed of the head with respect to the INC pattern becomes higher than a certain speed (at high speed moving), a synthesized absolute position calculation cannot be made in time. For this reason, there has been a problem that the comparison operation between the calculated absolute position and the synthesized absolute position can be performed only at about a speed at which the synthesized absolute position calculation can be made in time (at low speed moving).

An object of the present invention is to provide an encoder capable of improving reliability of the measurement value even at high speed moving.

Means for Solving the Problems

An encoder of the present invention is an encoder that reads a plurality of incremental patterns respectively having graduation array pitches different from each other and performs an arithmetic operation to output a measurement value, and the encoder includes: a reading device that moves relative to the plurality of incremental patterns to read the plurality of incremental patterns as respective electric signals; a control device that calculates the measurement value, based on the electric signals; and an output device that outputs the measurement value calculated by the control device, wherein the control device includes: an absolute position synthesis unit that synthesizes the plurality of electric signals read by the reading device to generate a synthesized absolute position; a detection unit that detects a plurality of relative positions from the plurality of respective electric signals read by the reading device; a position calculation unit that performs an arithmetic operation between at least anyone relative position of the plurality of relative positions and the synthesized absolute position to calculate a calculated absolute position; an absolute position comparison unit that compares the calculated absolute position with the synthesized absolute position; and a relative position comparison unit that compares the plurality of relative positions detected by the detection unit with each other, and the output device includes: a measurement value output unit that outputs the calculated absolute position, based on the measurement value; a first error output unit that outputs error information, based on a comparison result in the absolute position comparison unit; and a second error output unit that outputs error information, based on a comparison result in the relative position comparison unit.

With this configuration, the relative position comparison unit is included that compares the plurality of relative positions detected by the detection unit with each other, whereby an error between the plurality of relative positions can be detected and output even when the moving speed of the reading device with respect to the INC pattern becomes higher than a certain speed (at high speed moving) and a synthesized absolute position calculation cannot be made in time, so that reliability of the measurement value can be improved.

In addition, in a case of about a moving speed at which the synthesized absolute position calculation in the absolute position synthesis unit can be made in time (at low speed moving), an error of the calculated absolute position is detected also in the absolute position comparison unit in parallel with a comparison by the relative position comparison unit. For this reason, even when the error is not detected, such as when the relative positions compared by the relative position comparison unit are all shifted by the same amount, the absolute position comparison unit compares the calculated absolute position with the synthesized absolute position and the error can be detected, so that reliability of the measurement value can be improved.

At this time, it is preferable that the plurality of incremental patterns includes three incremental patterns respectively having graduation array pitches different from each other, and the second error output unit outputs error information when at least any one is different from other relative positions, of three relative positions compared with each other in the relative position comparison unit.

With this configuration, the relative position comparison unit compares the three relative positions with each other to detect the error, so that error detection accuracy can be further improved. That is, the relative position comparison unit performs the comparison operation to the three relative positions to detect the error when at least any one of the relative positions is shifted, so that the error can be detected more accurately than when there are two relative positions.

In addition, it is preferable that the position calculation unit performs an arithmetic operation between each of the plurality of relative positions and the synthesized absolute position to calculate a plurality of calculated absolute positions, and the relative position comparison unit compares the plurality of calculated absolute positions calculated by the position calculation unit with each other.

With this configuration, the relative position comparison unit compares the plurality of calculated absolute positions with each other calculated by performing an arithmetic operation between each of the plurality of relative positions and the synthesized absolute position, so that higher reliability can be obtained than when the relative positions are compared with each other.

DETAILED DESCRIPTION OF THE EMBODIMENTS

[First Embodiment]

Hereinafter, a first embodiment of the present invention will be described with reference to the drawings.

Figure 1:
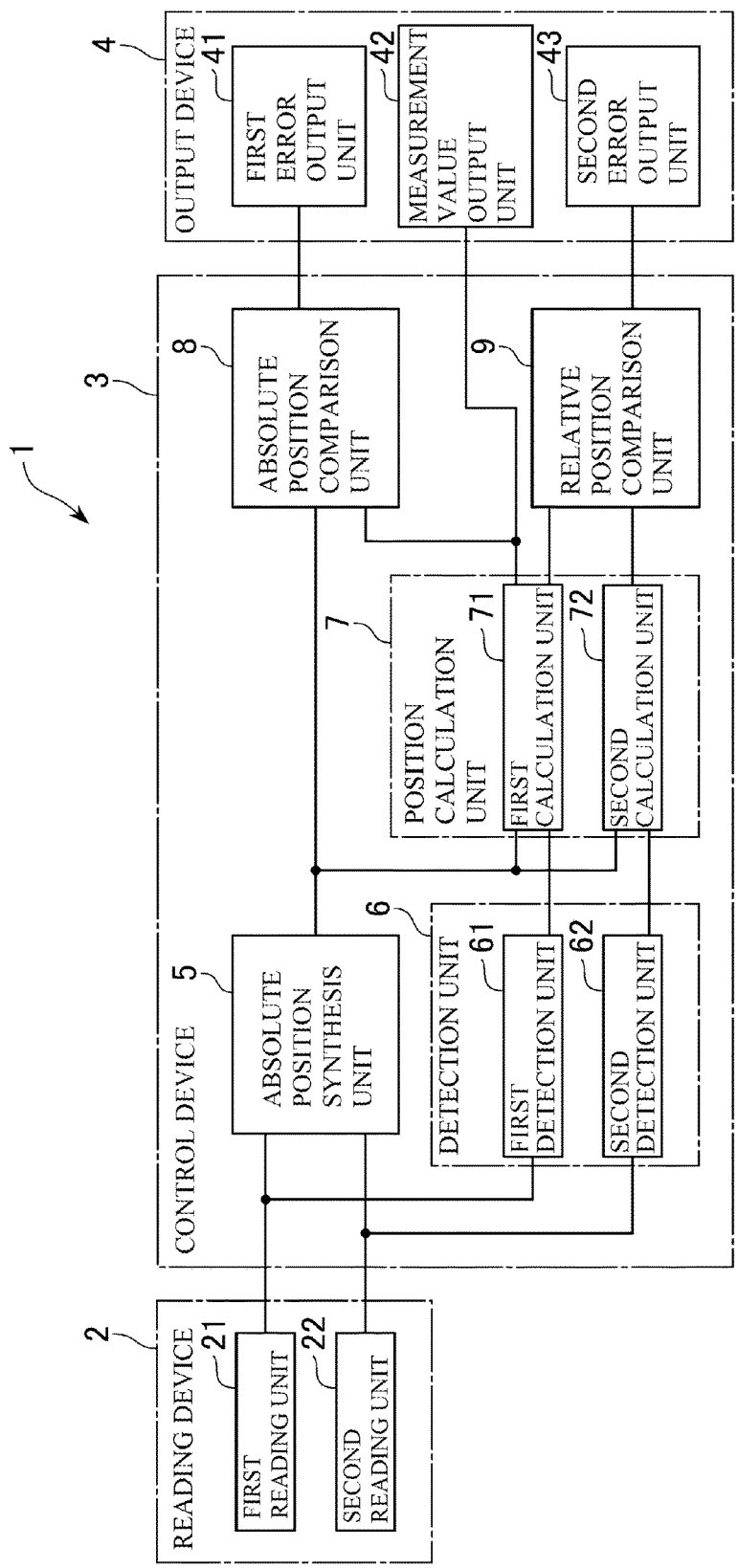
FIG. 1 is a block diagram of an encoder according to a first embodiment of the present invention.

FIG. 1 is a block diagram of an encoder according to a first embodiment of the present invention.

An encoder 1 is an electromagnetic induction type linear encoder, for example, and reads electric signals respectively having different wavelengths detected from two incremental patterns (hereinafter, referred to as INC patterns) respectively having graduation array pitches different from each other and performs an arithmetic operation, to measure a measurement value. The encoder 1 includes a scale having two INC patterns, and a head that moves relative to the scale in a measurement direction to read each of two INC patterns.

The head includes a reading device 2 including a transmitting coil and a receiving coil, the reading device 2 reading a relative movement amounts between the two INC patterns and the head as electric signals, as illustrated in FIG. 1.

The encoder 1 further includes a control device 3 that calculates the measurement value, based on the electric signals read by the reading device 2, and an output device 4 that outputs the measurement value calculated by the control device 3.

The two INC patterns include a first pattern from which a short wavelength electric signal (first signal) is detected, and a second pattern from which a long wavelength electric signal (second signal) is detected, for example. Incidentally, the two INC patterns only need to respectively have different wavelengths to be detected and be INC patterns from which a synthesized absolute position can be generated by synthesizing the detected electric signals.

The first pattern and the second pattern are formed by scale coils arrayed along the measurement direction, and arranged in parallel along the measurement direction of the scale.

The reading device 2 includes a first reading unit 21 that reads a relative movement amount between the first pattern and the head to output the amount as the first signal, and a second reading unit 22 that reads a relative movement amount between the second pattern and the head to output the amount as the second signal.

The control device 3 includes: an absolute position synthesis unit 5 that synthesizes the first signal and the second signal read by the reading device 2 to generate the synthesized absolute position; a detection unit 6 that detects two relative positions respectively from the first signal and the second signal read by the reading device 2; a position calculation unit 7 that performs an arithmetic operation between each of the two relative positions and the synthesized absolute position to calculate a calculated absolute position; an absolute position comparison unit 8 that compares the calculated absolute position and the synthesized absolute position; and a relative position comparison unit 9 that compares pieces of information based on the two relative positions detected by the detection unit 6 with each other.

The output device 4 includes: a first error output unit 41 that outputs error information, based on a comparison result in the absolute position comparison unit 8; a measurement value output unit 42 that outputs a measurement value, based on the calculated absolute position; and a second error output unit 43 that outputs error information, based on a comparison result in the relative position comparison unit 9.

The detection unit 6 has a first detection unit 61 that detects a first relative position from the first signal, and a second detection unit 62 that detects a second relative position from the second signal.

Here, the encoder 1 initially sets the synthesized absolute position synthesized by the absolute position synthesis unit 5 at initialization after turning on the power supply, in the position calculation unit 7, as a preset value.

The position calculation unit 7 has a first calculation unit 71 that calculates a first calculated absolute position from the preset value and the first relative position, and a second calculation unit 72 that calculates a second calculated absolute position from the preset value and the second relative position.

The position calculation unit 7 outputs the first calculated absolute position to the measurement value output unit 42 of the output device 4. The measurement value output unit 42 outputs the first calculated absolute position as a measurement value, and for example, outputs the measurement value on a display unit such as a display, or transmits the measurement value to a host device that controls a servo motor provided with the encoder 1, and the like.

In addition, the position calculation unit 7 outputs the first calculated absolute position to the absolute position comparison unit 8, and the absolute position comparison unit 8 performs the comparison operation between the synthesized absolute position generated by the absolute position synthesis unit 5 and the first calculated absolute position. Further, the position calculation unit 7 outputs the first calculated absolute position and the second calculated absolute position to the relative position comparison unit 9.

The absolute position comparison unit 8 performs the comparison operation between the synthesized absolute position synthesized by the absolute position synthesis unit 5 and the first calculated absolute position to detect an error. Specifically, when a difference between the synthesized absolute position and the first calculated absolute position exceeds a predetermined threshold value, an error is detected assuming that there is the error. The absolute position comparison unit 8 outputs the comparison result to the first error output unit 41. When the comparison result is the error, the first error output unit 41 outputs the error information. The first error output unit 41 turns on an LED to notify a user, or communicates the error information to the host device, for example.

The relative position comparison unit 9 performs the comparison operation between the first calculated absolute position calculated by the position calculation unit 7 and the second calculated absolute position to detect an error of the calculated absolute position. Specifically, when a difference between the first calculated absolute position and the second calculated absolute position exceeds a predetermined threshold value, an error is detected assuming that there is the error. The relative position comparison unit 9 outputs the comparison result to the second error output unit 43. When the comparison result is the error, the second error output unit 43 outputs the error information. The second error output unit 43 turns on the LED to notify the user, or communicates the error information to the host device, for example. Incidentally, the absolute position comparison unit 8 and the relative position comparison unit 9 are executed independently from each other.

Here, in the present embodiment, the relative position comparison unit 9 performs the comparison operation between the first calculated absolute position calculated by the position calculation unit 7 and the second calculated absolute position; however, the comparison operation may be performed between the first relative position detected by the detection unit 6 and the second relative position. That is, the relative position comparison unit 9 only needs to perform comparison operation between pieces of information based on the relative positions detected by the detection unit 6.

Figure 2:
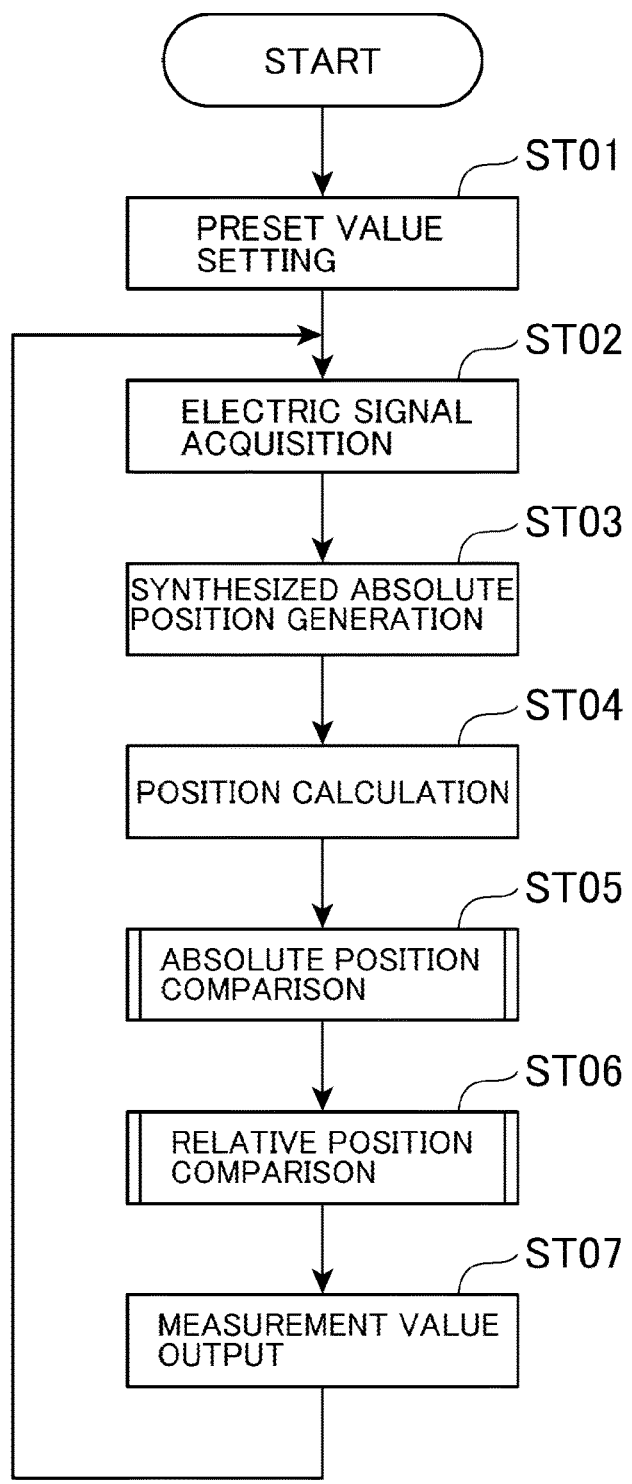
FIG. 2 is a flowchart illustrating operation of a control device of the encoder.

FIG. 2 is a flowchart illustrating operation of a control device of the encoder.

Operation of the control device 3 will be described with reference to FIG. 2.

The encoder 1 starts measurement when the power supply is turned on by the user or the host device.

At the time of turning on the power supply, first, the absolute position synthesis unit 5 of the control device 3 reads the first signal and the second signal that are electric signals via the reading device 2 from the first pattern and the second pattern on the scale. The absolute position synthesis unit 5 synthesizes the first signal and the second signal to generate the synthesized absolute position, and initially sets the synthesized absolute position as a preset value in the position calculation unit 7 (step ST01).

Next, the absolute position synthesis unit 5 and the detection unit 6 acquire the first signal and the second signal (step ST02).

Subsequently, the absolute position synthesis unit 5 synthesizes the first signal and the second signal acquired from the reading device 2 to generate the synthesized absolute position (step ST03). The generated synthesized absolute position is output to the absolute position comparison unit 8.

Subsequently, the position calculation unit 7 performs an arithmetic operation between the first relative position and the second relative position detected by the detection unit 6 and the preset value to calculate the first calculated absolute position and the second calculated absolute position (step ST04).

Subsequently, the absolute position comparison unit 8 performs the comparison operation between the first calculated absolute position and the synthesized absolute position to detect whether or not the calculated absolute position has an error (step ST05: absolute position comparison step).

The relative position comparison unit 9 performs the comparison operation between the first calculated absolute position and the second calculated absolute position to detect whether or not the relative position has an error (step ST06: relative position comparison step).

The measurement value output unit 42 outputs the first calculated absolute position acquired from the position calculation unit 7, as a measurement value (step ST07). Incidentally, even when an error is detected or not detected in the absolute position comparison step (step ST05) and the relative position comparison step (step ST06), in both cases, the measurement value output unit 42 outputs the measurement value.

Then, the encoder 1 returns to step ST02 and continues the measurement.

Figure 3:
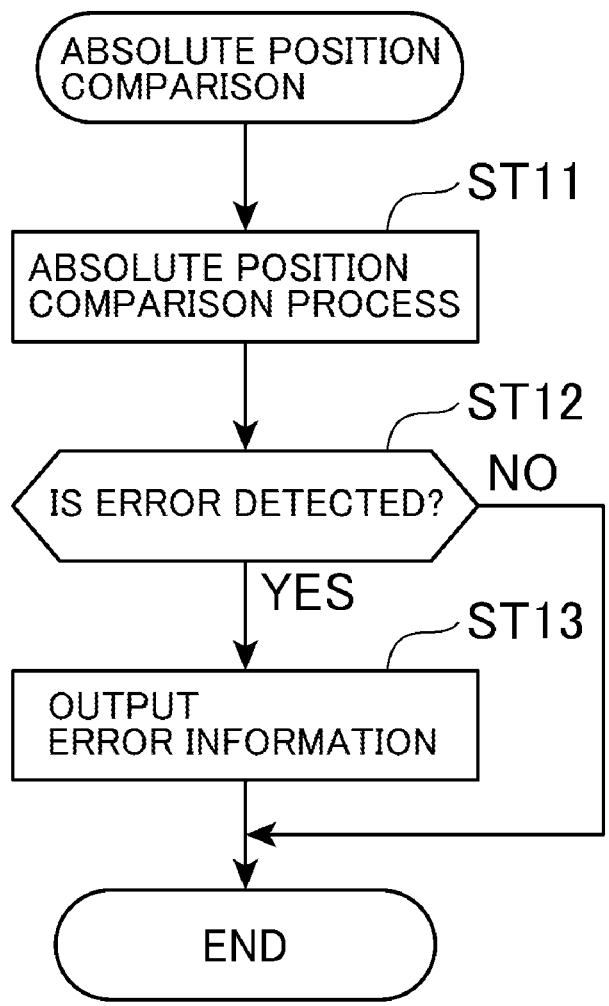
FIG. 3 is a flowchart illustrating operation of an absolute position comparison step of the encoder.

FIG. 3 is a flowchart illustrating operation of the absolute position comparison step of the encoder. Specifically, it is a flowchart illustrating operation of the absolute position comparison unit 8 in step ST05 in FIG. 2. The operation of the absolute position comparison unit 8 will be described with reference to FIG. 3.

The absolute position comparison unit 8 executes an absolute position comparison process that performs the comparison operation between the synthesized absolute position generated by the absolute position synthesis unit 5 and the first calculated absolute position calculated by the first calculation unit 71 of the position calculation unit 7 to detect an error (step ST11).

As a result of the comparison operation between the synthesized absolute position and the first calculated absolute position in the absolute position comparison process, when an error is detected (YES in step ST12), the absolute position comparison unit 8 outputs the error information to the first error output unit 41 (step ST13).

When the error information is acquired from the absolute position comparison unit 8, the first error output unit 41 turns on the LED to notify the user, or communicate the error information to the host device. Then, the user or the host device stops the encoder 1, and resets the encoder 1.

When an error is not detected in the absolute position comparison process (NO in step ST12), the absolute position comparison unit 8 does not output the error information, and the measurement by the encoder 1 is continued.

Figure 4:
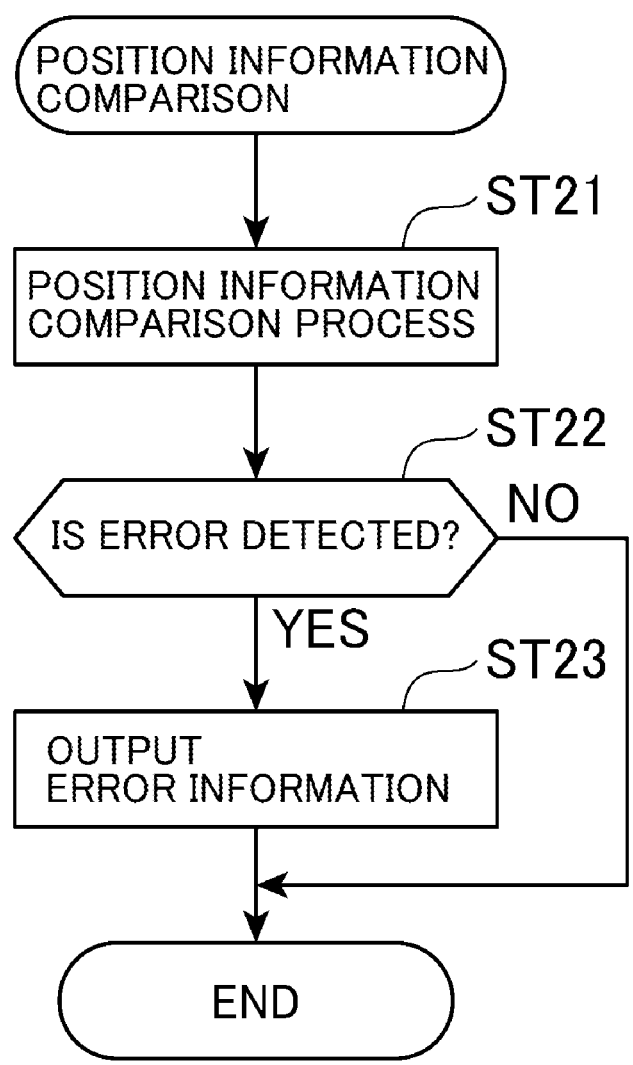
FIG. 4 is a flowchart illustrating operation of a relative position comparison step of the encoder.

FIG. 4 is a flowchart illustrating operation of the relative position comparison step of the encoder. Specifically, it is a flowchart illustrating operation of the relative position comparison unit 9 in step ST06 in FIG. 2. The operation of the relative position comparison unit 9 will be described with reference to FIG. 4.

The relative position comparison unit 9 executes a relative position comparison process that performs the comparison operation between the first calculated absolute position and the second calculated absolute position to detect an error (step ST21).

As a result of the comparison operation between the first calculated absolute position and the second calculated absolute position in the relative position comparison process, when an error is detected (YES in step ST22), the relative position comparison unit 9 outputs the error information to the second error output unit 43 (step ST23).

When the error information is acquired from the relative position comparison unit 9, the second error output unit 43 turns on the LED to notify the user or communicate the error information to the host device. Then, the user or the host device stops the encoder 1, and resets the encoder 1.

When an error is not detected in the relative position comparison process (NO in step ST22), the relative position comparison unit 9 does not output the error information, and the measurement by the encoder 1 is continued.

With the first embodiment, the following functions and effects can be obtained.

(1) The encoder 1 includes the relative position comparison unit 9 that compares two calculated absolute positions calculated by the position calculation unit 7 with each other, based on two relative positions detected by the detection unit 6, whereby an error between the two calculated absolute positions (relative positions) can be detected and output to the second error output unit 43 even when the moving speed of the reading device 2 with respect to the INC pattern becomes higher than a certain speed and a calculation of the synthesized absolute position cannot be made in time, so that reliability of the measurement value can be improved.

(2) In a case of about a moving speed at which the synthesized absolute position calculation in the absolute position synthesis unit 5 can be made in time, the encoder 1 detects an error of the calculated absolute position also in the absolute position comparison unit 8 in parallel with a comparison by the relative position comparison unit 9. For this reason, even when the error is not detected, such as when the calculated absolute positions (relative positions) compared by the relative position comparison unit 9 are all shifted by the same amount, the absolute position comparison unit 8 compares the calculated absolute position with the synthesized absolute position and the error can be detected, so that reliability of the measurement value can be improved.

(3) The relative position comparison unit 9 compares two calculated absolute positions with each other calculated by an arithmetic operation between two relative positions and the synthesized absolute position, so that higher reliability can be obtained than when the relative positions are compared with each other.

[Second Embodiment]

Hereinafter, a second embodiment of the present invention will be described with reference to the drawings. Incidentally, in the following description, parts already described are denoted by the same reference numerals, and description thereof is omitted.

Figure 5:
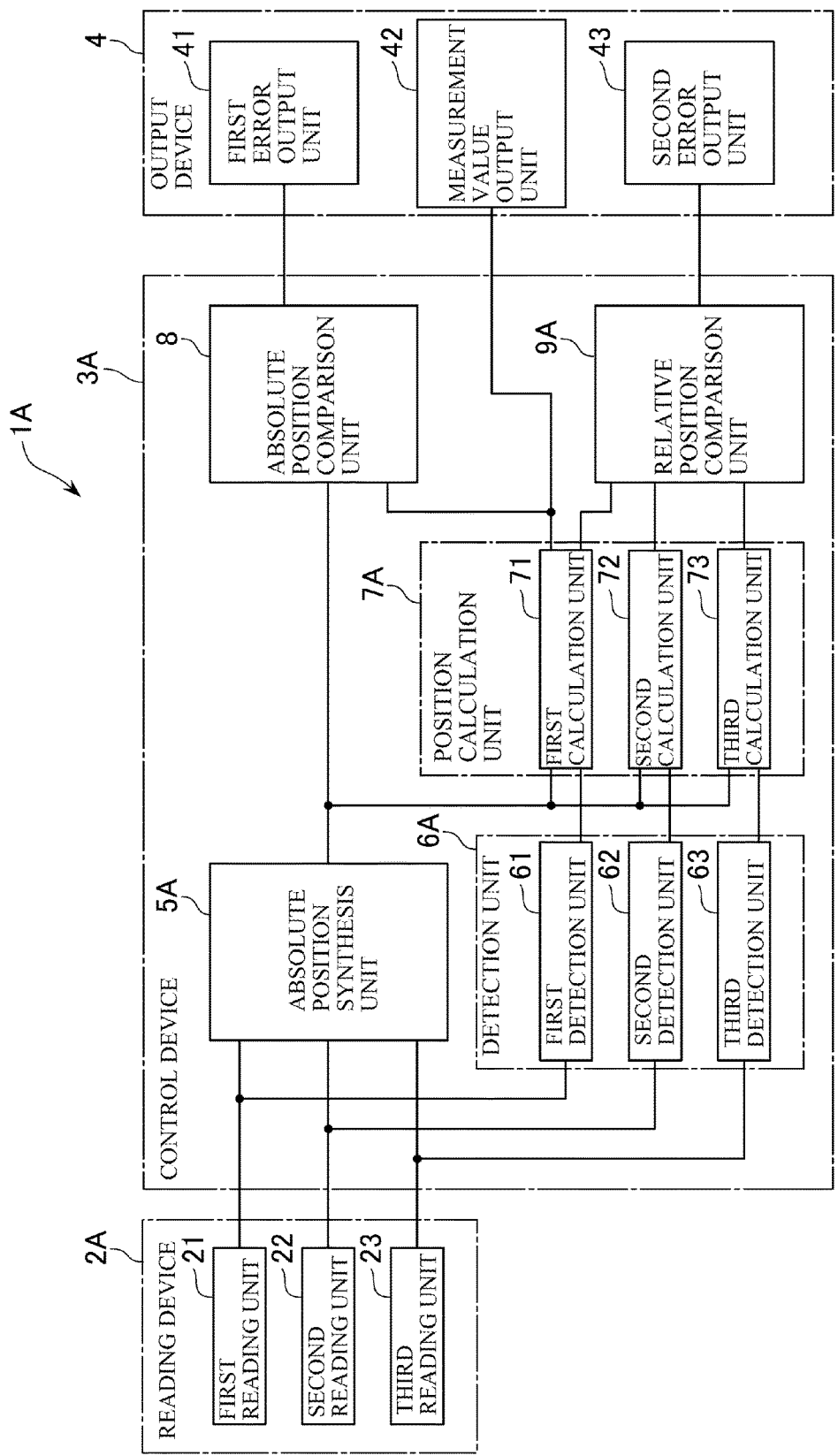
FIG. 5 is a block diagram of an encoder according to a second embodiment of the present invention.

FIG. 5 is a block diagram of an encoder according to a second embodiment of the present invention.

An encoder 1A of the present embodiment includes a configuration substantially the same as that of the encoder 1 of the first embodiment, and includes a scale having three INC patterns and a reading device 2A that reads each of the three INC patterns. In addition to a first pattern and a second pattern, the three INC patterns further include a third pattern from which an electric signal is detected having a wavelength different from those of the first pattern and the second pattern.

In addition, the encoder 1A further includes a control device 3A that calculates a measurement value, based on the electric signal read by the reading device 2A, as illustrated in FIG. 5.

The reading device 2A further includes a third reading unit 23 that reads and outputs a relative movement amount between the third pattern and a head as a third signal, and the control device 3A further includes: an absolute position synthesis unit 5A that generates a synthesized absolute position from three electric signals; a third detection unit 63 that detects a third relative position from the third signal in a detection unit 6A; a third calculation unit 73 that calculates a third calculated absolute position from the third relative position and a preset value in a position calculation unit 7A; and a relative position comparison unit 9A that performs the comparison operation between three calculated absolute positions (relative positions) to detect an error.

In the first embodiment, the absolute position synthesis unit 5 acquires and synthesizes the first signal and the second signal from the first reading unit 21 and the second reading unit 22 to generate the synthesized absolute position. The absolute position synthesis unit 5A of the present embodiment is different from the first embodiment in that the unit 5A synthesizes three electric signals of the first signal to the third signal detected by the first reading unit 21 to the third reading unit 23 to generate the synthesized absolute position in the absolute position comparison process in step ST11 illustrated in FIG. 3.

In addition, in the first embodiment, the relative position comparison unit 9 acquires the first calculated absolute position and the second calculated absolute position from the first calculation unit 71 and the second calculation unit 72 to perform the comparison operation. The relative position comparison unit 9A of the present embodiment is different from the first embodiment in that the unit 9A acquires the first-third calculated absolute positions and compares the positions with each other, to detect an error when at least any one calculated absolute position is different from other calculated absolute positions of the three calculated absolute positions, in the relative position comparison process in step ST21 illustrated in FIG. 4.

In the present embodiment, the functions and effects similar to (1)-(3) in the first embodiment can be obtained, and besides, the following function and effect can be obtained.

(4) The relative position comparison unit 9A of the encoder 1A compares the three calculated absolute positions (relative positions) with each other to detect the error, so that error detection accuracy can be further improved. That is, the relative position comparison unit 9A performs the comparison operation between the three calculated absolute positions (relative positions) to detect the error when at least any one calculated absolute position is shifted, so that the error can be detected more accurately than when there are two calculated absolute positions (relative positions).

[Modification of Embodiment]

Incidentally, the present invention is not limited to the embodiments, and modifications and improvements within the scope of achieving the object of the present invention are included in the present invention.

For example, in the embodiments, the cases have been described where the present invention is applied to the encoders 1, 1A of the electromagnetic induction type linear encoder as examples; however, the encoder may be a rotary encoder. In addition, the encoder only needs to include a scale having a plurality of INC patterns, and a type of a detector and a detection method are not particularly limited. Therefore, instead of the electromagnetic induction type, a capacitance type or a photoelectric type may be used.

In addition, in the second embodiment, the encoder 1A has been described that includes three INC patterns respectively having graduation array pitches different from each other; however, the encoder may include four or more INC patterns.

In the second embodiment, the absolute position synthesis unit 5A synthesizes three electric signals to generate the synthesized absolute position; however, the unit 5A may synthesize two electric signals to generate the synthesized absolute position. That is, it is sufficient to be capable of synthesizing a plurality of electric signals to generate the synthesized absolute position, and not particularly limited.

In the embodiments, the absolute position comparison units 8, 8A compare the synthesized absolute position generated by the absolute position synthesis units 5, 5A with the first calculated absolute position calculated by the first calculation unit 71 of the position calculation units 7, 7A; however, the comparison operation to the synthesized absolute position may be performed with the second calculated absolute position, or may be performed with the third calculated absolute position. In addition, the comparison operation to the synthesized absolute position may be performed with a plurality of calculated absolute positions. That is, the calculated absolute position to which the comparison operation is performed with the synthesized absolute position in the absolute position comparison units 8, 8A only needs to be the calculated absolute position calculated by the position calculation units 7, 7A.

Figure 6:
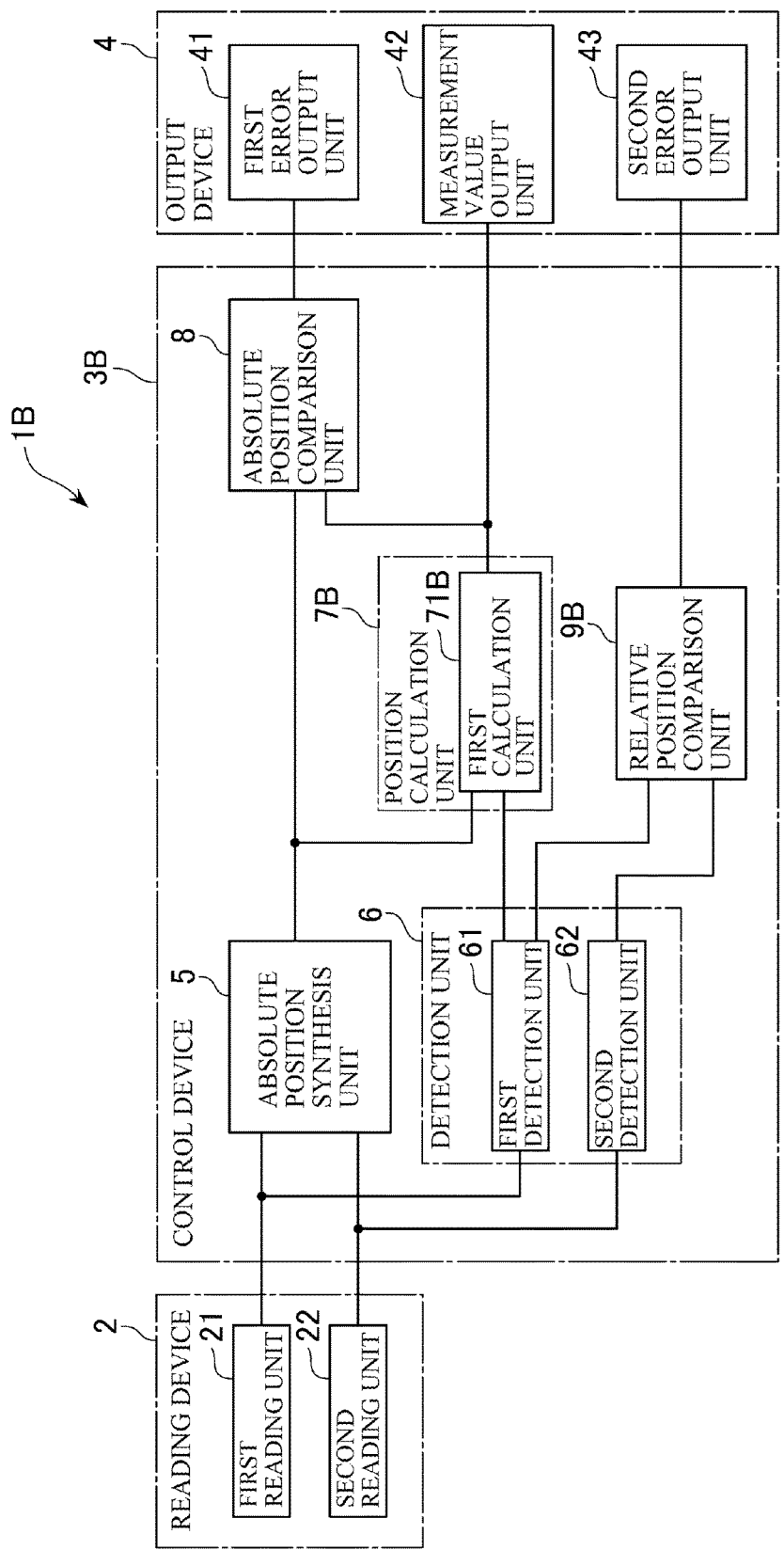
FIG. 6 is a block diagram of an encoder according to a modified example of the present invention.

In the embodiments, the relative position comparison units 9, 9A performs the comparison operation between the plurality of calculated absolute positions calculated by the arithmetic operation between each of the plurality of relative positions and the preset value in the position calculation unit 7,7A; however, as illustrated in FIG. 6, a relative position comparison unit 9B may acquire the plurality of relative positions from a detection unit 6B and performs the comparison operation between the relative positions to detect an error.

Specifically, the calculated absolute position calculation is executed by a first calculation unit 71B of a position calculation unit 7B in a control device 3B. The relative position comparison unit 9B acquires the first relative position and the second relative position from the first detection unit 61 and the second detection unit 62, not the calculated absolute position calculated by the position calculation unit 7B. Then, the unit 9B may perform a comparison operation between the acquired first relative position and second relative position, and detect whether or not each relative position has an error.

INDUSTRIAL APPLICABILITY

As described above, the present invention can be suitably applied to an absolute encoder including a reading device that reads a plurality of relative movement amounts from a plurality of respective incremental patterns provided on a scale, the absolute encoder synthesizing the plurality of relative movement amounts to acquire absolute position information.

What is claimed is:

1. An encoder that reads a plurality of incremental patterns respectively having graduation array pitches different from each other and performs an arithmetic operation to output a measurement value, the encoder comprising:
   a reading device that moves relative to the plurality of incremental patterns to read the plurality of incremental patterns as respective electric signals; a control device that calculates the measurement value, based on the electric signals; and an output device that outputs the measurement value calculated by the control device, wherein
   the control device includes:
   an absolute position synthesis unit that synthesizes the plurality of electric signals read by the reading device to generate a synthesized absolute position;
   a detection unit that detects a plurality of relative positions from the plurality of respective electric signals read by the reading device;
   a position calculation unit that performs an arithmetic operation between at least any one relative position of the plurality of relative positions and the synthesized absolute position to calculate a calculated absolute position;
   an absolute position comparison unit downstream of the position calculation unit and downstream of the absolute position synthesis unit, the absolute position comparison unit comparing the calculated absolute position with the synthesized absolute position; and
   a relative position comparison unit downstream of the detection unit, the relative position comparison unit comparing the plurality of relative positions detected by the detection unit with each other, and
   the output device includes:
   a measurement value output unit that outputs the calculated absolute position, based on the measurement value;
   a first error output unit that outputs error information, based on a comparison result in the absolute position comparison unit; and
   a second error output unit that outputs error information, based on a comparison result in the relative position comparison unit.

2. The encoder according to claim 1, wherein
the plurality of incremental patterns includes three incremental patterns respectively having graduation array pitches different from each other, and
the second error output unit outputs error information when at least any one is different from other relative positions, of three relative positions compared with each other in the relative position comparison unit.

3. The encoder according to claim 2, wherein
the position calculation unit
performs an arithmetic operation between each of the plurality of relative positions and the synthesized absolute position to calculate a plurality of calculated absolute positions, and
the relative position comparison unit
compares the plurality of calculated absolute positions calculated by the position calculation unit with each other.

4. The encoder according to claim 1, wherein
the position calculation unit
performs an arithmetic operation between each of the plurality of relative positions and the synthesized absolute position to calculate a plurality of calculated absolute positions, and
the relative position comparison unit
compares the plurality of calculated absolute positions calculated by the position calculation unit with each other.

* * * * *